United States Patent [19]

Cachia

[11] 4,190,212
[45] Feb. 26, 1980

[54] COMFORT MECHANISM FOR SEAT BELT RETRACTOR

[75] Inventor: Joseph M. Cachia, New Haven, Mich.

[73] Assignee: Allied Chemical Corporation, Morris Township, Morris County, N.J.

[21] Appl. No.: 791,618

[22] Filed: Apr. 27, 1977

[51] Int. Cl.² .................... A62B 35/00; B65H 75/48
[52] U.S. Cl. ............................ 242/107; 242/107.4 R
[58] Field of Search ........................ 242/107–107.7; 280/744–747; 297/388

[56] References Cited

U.S. PATENT DOCUMENTS

| | | | |
|---|---|---|---|
| 3,984,063 | 10/1976 | Knieriemen | 242/107.4 R X |
| 4,026,494 | 5/1977 | Tanaka | 242/107 |
| 4,081,153 | 3/1978 | Tanaka et al. | 242/107 |
| 4,113,200 | 9/1978 | Tanaka | 242/107 |

FOREIGN PATENT DOCUMENTS 2606293  9/1976 Fed. Rep. of Germany .......... 242/107

Primary Examiner—John M. Jillions
Attorney, Agent, or Firm—Roger H. Criss

[57] ABSTRACT

A safety belt retractor comprising a frame, a spool mounted for rotation on the frame and having seat belt webbing wound thereon, first means biasing the spool in a rewind direction and means for reducing the tension of the webbing against the wearer due to the bias force of the first biasing means, the tension reducing means comprising a second means biasing the spool in a rewind direction and having a lower biasing force than the first biasing means and blocking means having an operable position at which it prevents the first biasing means from rotating the spool and an inoperable position at which it does not prevent such rotation, the blocking means being in the operable position after extension of the seat belt webbing to a position of use, and the second biasing means operable to wind the webbing when the blocking means is in its operable position.

5 Claims, 9 Drawing Figures

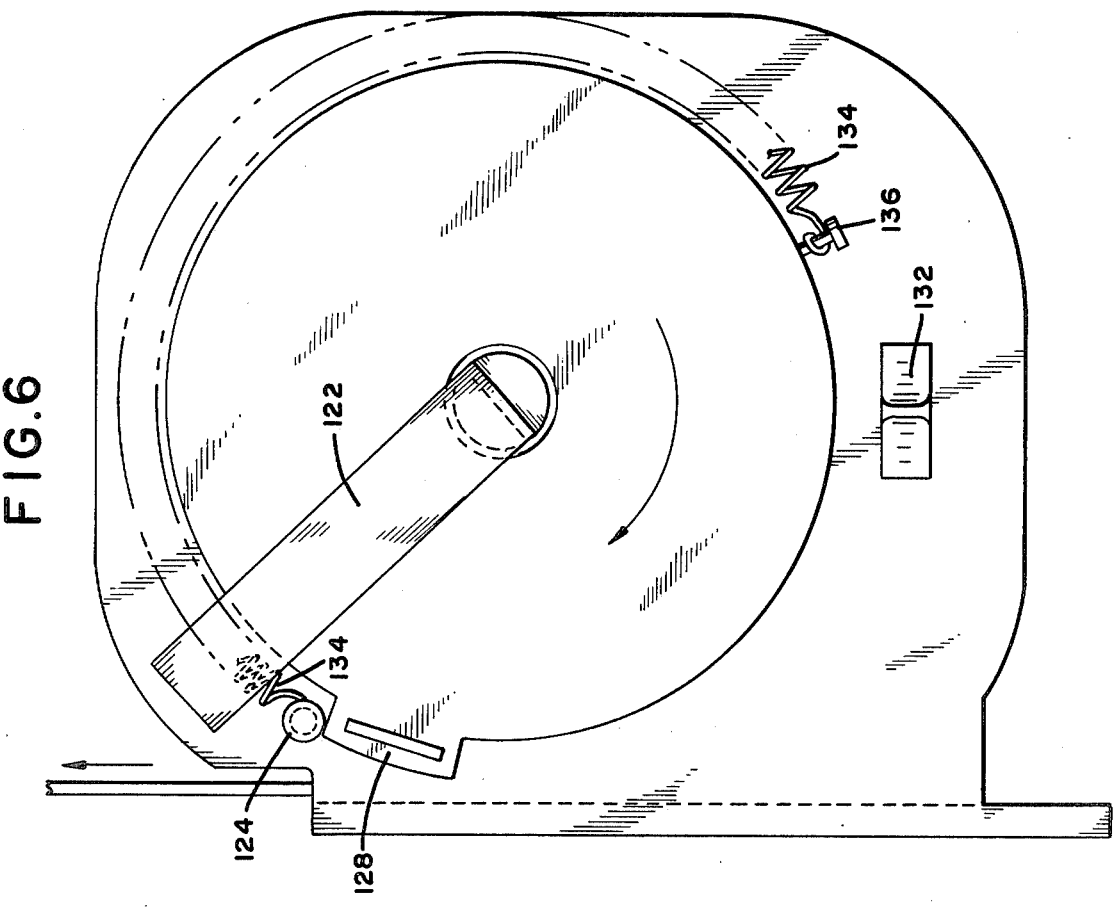
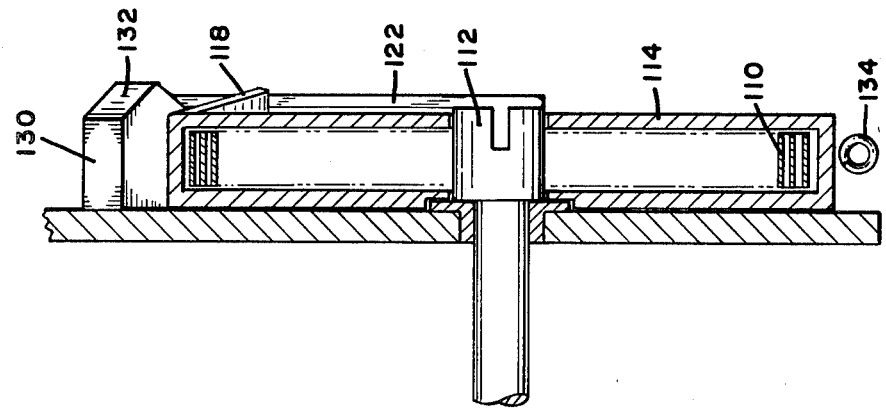

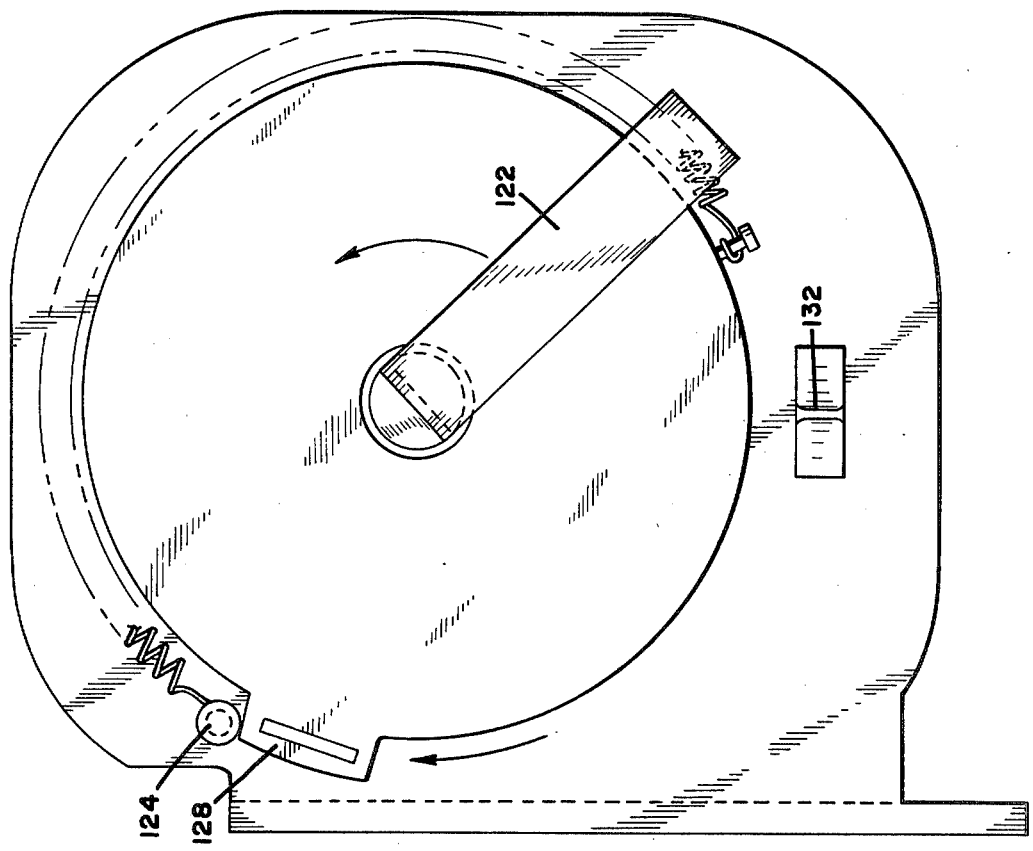
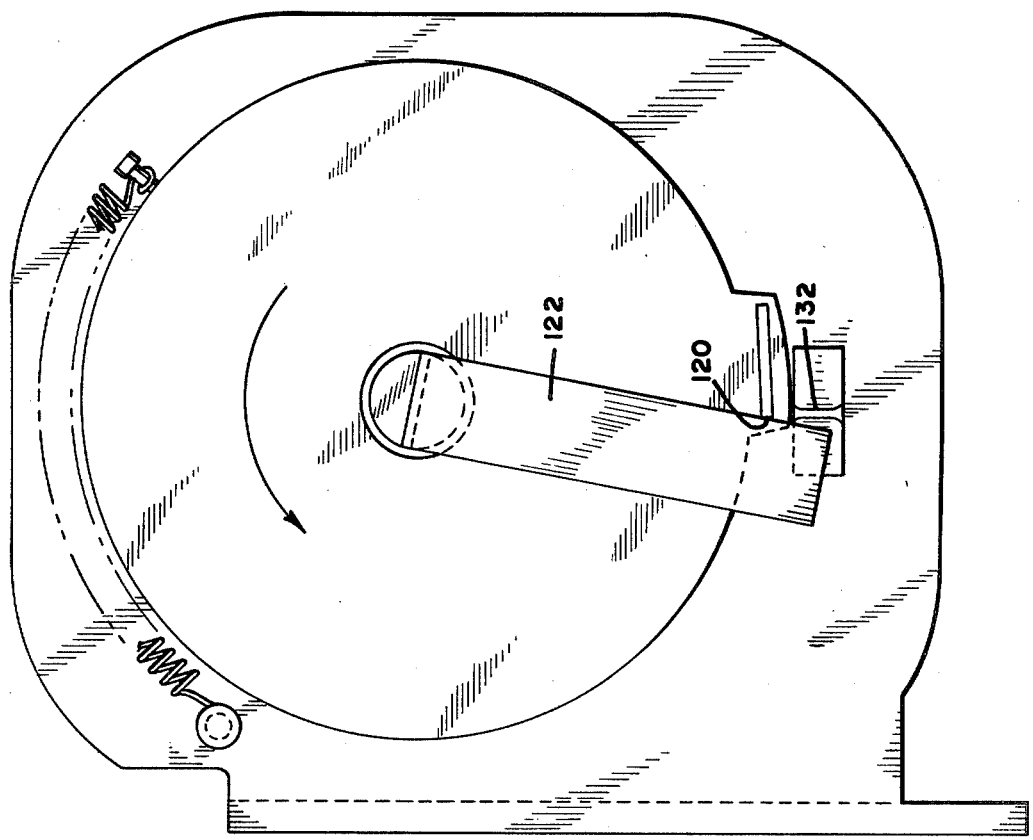

COMFORT MECHANISM FOR SEAT BELT RETRACTOR

BACKGROUND OF THE INVENTION

1. Field of the Invention

This invention relates to a comfort rewind mechanism for a seat belt retractor.

2. Description of the Prior Art

Seat belt retractors of the emergency locking type are designed to permit withdrawal of seat belt webbing against the bias of the rewind spring so that the belt may be buckled about the wearer. Such retractors permit further extension of the belt as well as retraction of the belt as the wearer moves about in his seat and are provided with a locking mechanism which prevents extension of the belt in emergency conditions, such as in the event of a sudden deceleration of the vehicle. The rewind springs of such retractors of necessity exert a substantial rewind force and it has been found that the pressure of the spring bias in uncomfortable to the wearer, expecially in the shoulder area.

It has been suggested in several U.S. patents to provide a means of eliminating the tension exerted by the rewind spring. Exemplary of such patents are U.S. Reissue Pat. No. 29,095 to Heath and U.S. Pat. Nos. 3,851,836 to Sprecher, 3,869,098 to Sprecher and 4,002,311 to Fisher et al. In each of these patents, means are provided which totally block out the force of the rewind spring after the belt is buckled about the user and then extended further and retracted from the extended position.

The prior comfort designs are of the so-called "tension elimination" design, that is, the rewind spring is blocked out when in use, and while providing improved comfort for the user, can be misused in that an excess amount of belt may remain about the user during operation of the vehicle. Moreover, such designs require a separate releasing mechanism to permit retraction of the seat belt. These mechanisms, such as a mechanical or solenoid door release, add cost and complexity to the comfort mechanism system. It would be desirable if a comfort mechanism for a seat belt retractor were provided which alleviates the above-mentioned problems.

SUMMARY OF THE INVENTION

In accordance with this invention, there is provided a safety belt retractor comprising a frame, a spool mounted for rotation on the frame and having seat belt webbing wound thereon, first means biasing the spool in a rewind direction and means for reducing the tension of the webbing against the wearer due to the bias force of the first biasing means, the tension reducing means comprising a second means biasing the spool in a rewind direction and having a lower biasing force than the first biasing means and blocking means having an operable position at which it prevents the first biasing means from rotating the spool and an inoperable position at which it does not prevent such rotation, the blocking means being in the operable position after extension of the seat belt webbing to a position of use, and the second biasing means operable to rewind the webbing when the blocking means is in its operable position. The blocking means is in its inoperable position upon a predetermined amount of rewind rotation of the spool subsequent to a limited rewind rotation of the webbing by the second biasing means.

The present invention thereby permits automatic take-up of any slack in the webbing after buckling about the user and such rewind is under a lighter and more comfortable load than that exerted by the stronger, or main, rewind spring. The wearer is free to move about in his seat under such lighter load on the webbing, although, preferably, further extension or rewing of the webbing beyond a predetermined amount will deactivate the blocking means, and hence the tension reducing means, and for a predetermined distance the first biasing means is permitted to exert its greater rewind force, whereupon the blocking means is reactivated, all as is more specifically described hereinbelow.

BRIEF DESCRIPTION OF THE DRAWINGS

FIG. 5 is a cross-sectional view of the spring cup assembly of FIG. 4.

FIG. 6 is a side view along line 10—10 of FIG. 4 and shows the blocking means in its position prior to extraction.

FIG. 8 is similar to FIG. 6 and shows the blocking means at the point of disengagement.

FIG. 9 is similar to FIG. 6 and shows the blocking means in its inoperable position and the retractor in the normal rewind position.

DESCRIPTION OF THE PREFERRED EMBODIMENTS

Figure 1:
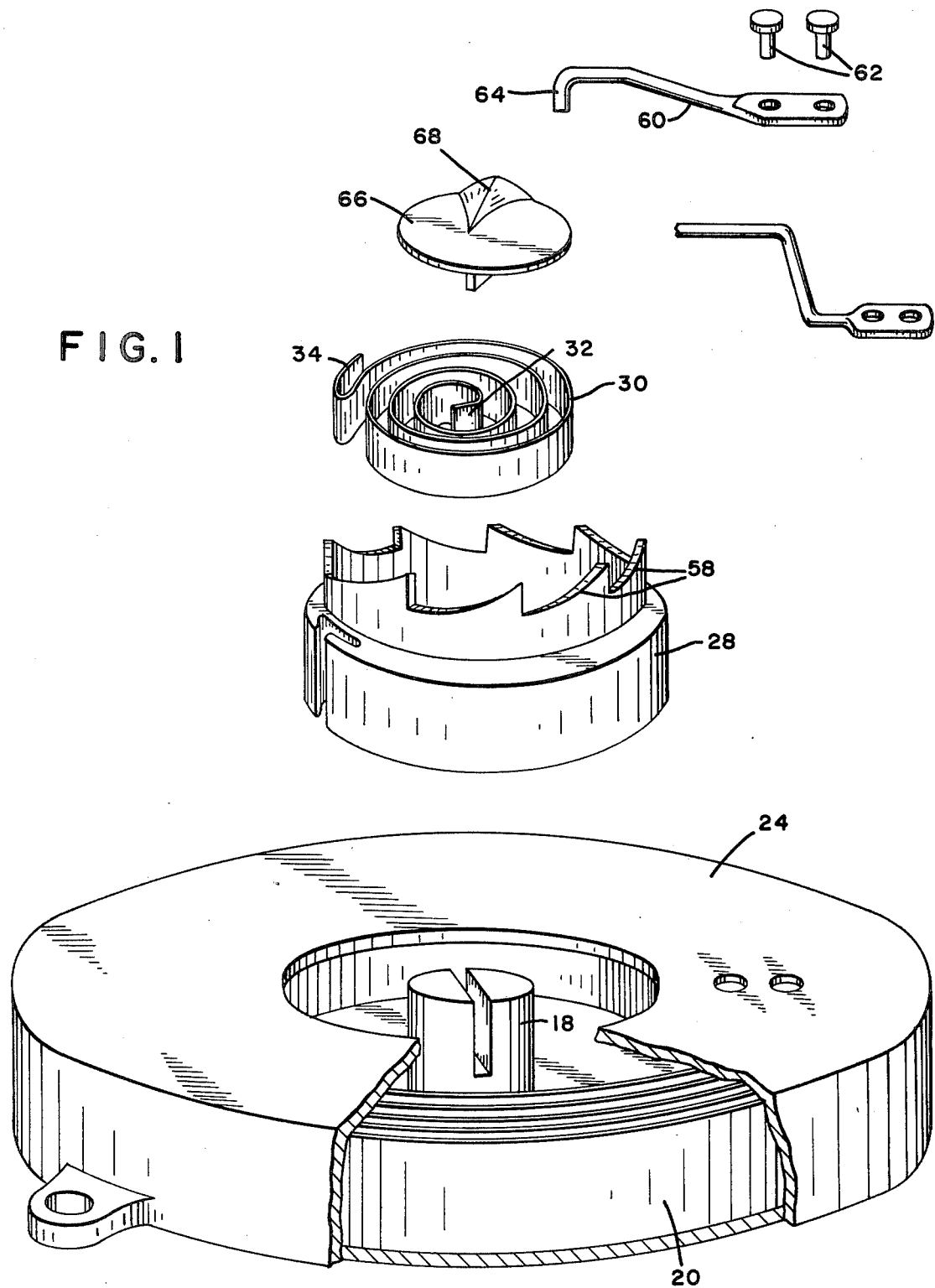
FIG. 1 is an exploded view of one embodiment of the tension reducing mechanism of this invention.

The safety belt retractor may be of any of the known emergency locking retractor designs such as, for example, that shown in U.S. Pat. No. 3,838,831 to Bell, the disclosure of which is expressly incorporated herein by reference. The retractor, generally indicated at 10, has a general U-shape and includes a frame 12 having two end flanges 14. Retractor 10 is typically mounted in the vehicle, such as on an interior vehicle pillar, so that the belting may extend over the shoulder and across the lap of the wearer, with the free end of the belt being latched in the usual manner. Supported for rotation in frame 12 is spool 16 mounted on shaft 18 and provided with seat belt webbing (not shown). Also supported on the shaft is a ratchet wheel and an associated emergency locking device such as a pendulum-actuated latch (also not shown). As usual, one end of the webbing is retained in the spool and the other end is affixed to a belt tongue which is adapted to lock with a seat belt buckle.

With reference to embodiment shown in FIGS. 1–4, main rewind spiral spring 20 has its outer end attached to a spring cup 24 of conventional design except for a central opening surrounding shaft 18. Spring cup 24 may be formed from a suitable material, such as a synthetic polymeric resin. The inner end of rewind spring 20 is attached to a second spring cup 28 which also may be formed from a plastic resin and which is mounted for rotation on shaft 18. Spring cup 28 provides an annular housing for a comfort spiral spring 30 which is weaker than main rewind spring 20. Comfort spring 30 has its inner end 32 attached to shaft 18 and its outer end 34 attached to its spring cup 28.

Blocking means are provided which, when operable, prevent rewind spring 20 from rotating shaft 18 in the rewind direction.

Figure 2:
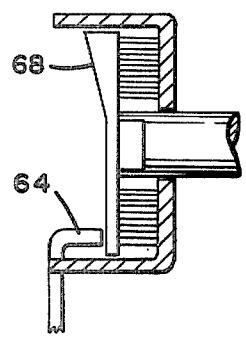
FIG. 2 is a cross-sectional view of the mechanism of FIG. 1, showing the blocking means in its operable position.
Figure 3:
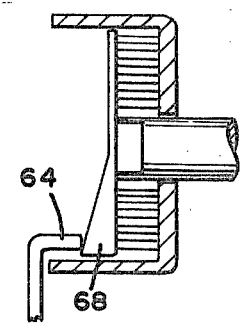
FIG. 3 is similar to FIG. 2 except that the blocking means is in its inoperable position.
Figure 4:
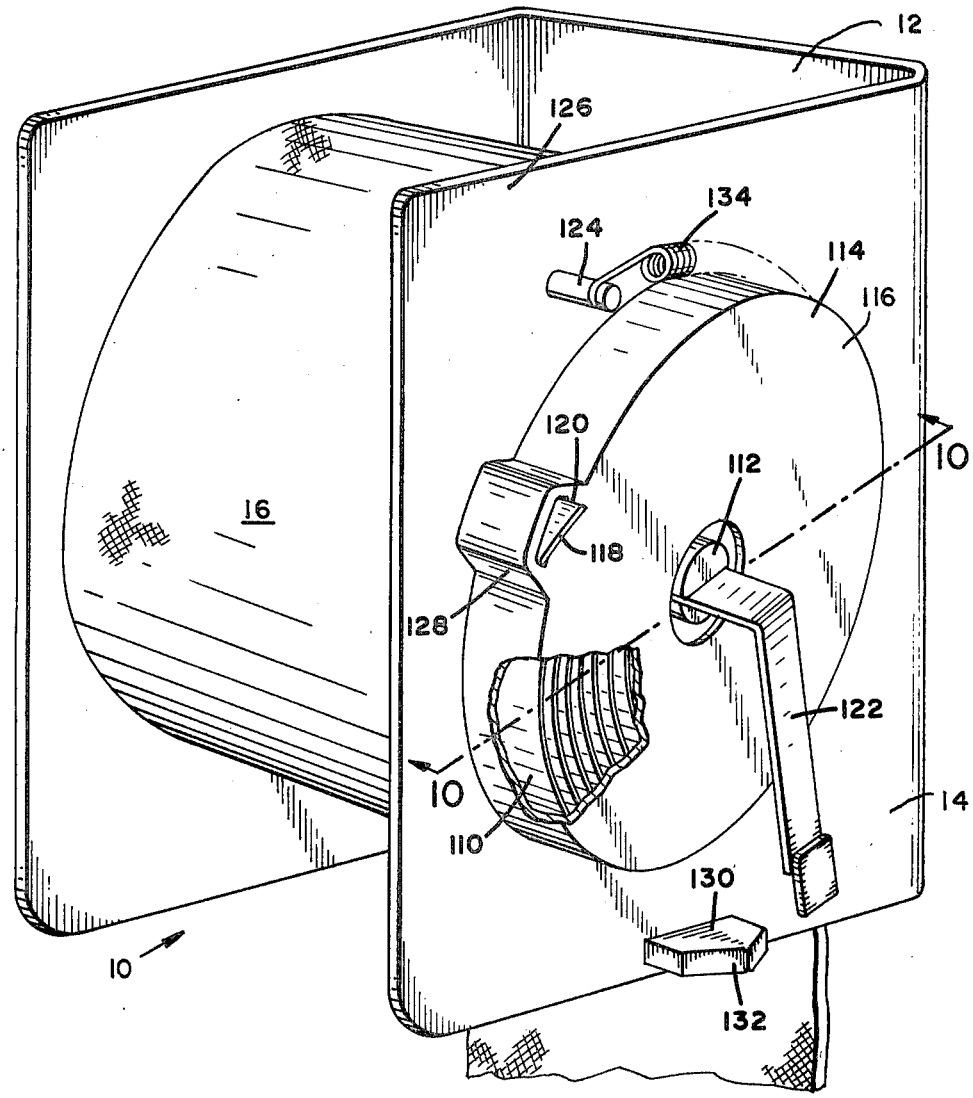
FIG. 4 is a perspective view of another embodiment of this invention.

In accordance with the embodiment of this invention shown in FIGS. 1—3, upper surface of spring cup 28 is provided with a series of gear teeth 58 which are shaped to provide a locking action only in the rewind direction. Spring member 60 has one end attached to the stationary spring cup 24 via pins 62 and the other end 64 adapted for engagement with teeth 58. Locking end 64 is suitably shaped for locking engagement with teeth 58. A cap 66 having a cam portion 68 is adapated to contact locking end 64 and lift it above teeth 58 of spring cup 28.

In operation, extension of the webbing from its fully wound-up position will initially tighten comfort spring 30 to its full or "solid" state and will also cause rotation of spring cup 28 in the extend direction. Once comfort spring 30 is solid, further extension of the webbing begins to wind up rewind spring 20. As the webbing is extended, locking end 64 of spring 60 rides over teeth 58. Upon retraction from the buckled position, locking end 64 comes into contact with a tooth 58 and thereby locks cup 28 from rewind rotation. Once locking spring 60 is engaged by teeth 58, rewind spring 20 is prevented from exerting its rewind bias and is thus blocked out. Comfort spring 30 is thereby permitted to exert its lighter rewind force on shaft 18. One rotation of shaft 18 under this lighter load is possible, until cap 66 is rotated so that its cam portion 68 engages locking end 64 and lifts it away from teeth 58. When locking end 64 is disengaged, rewind spring 20 is reactivated and rewinds shaft 18 under greater force until it is again blocked by another tooth 58. When rewind spring 20 is so blocked, comfort spring 30 again rewinds shaft 18 for one revolution until rewind spring 20 is once more reactivated. The spring of teeth 58 may be arranged to provide the desired comfort zones and mode of rewind operation.

With respect to the embodiment depicted in FIGS. 4–9, main rewind spring 110 has its inner end attached to shaft 112 and its outer end attached to spring cup 114 which is mounted for rotation on shaft 112. Spring cup 114, which may be formed from a plastic resin, is provided with a radially outwardly extending portion 128. Upper surface 116 of portion 128 of spring cup 114 is provided with a ramp 118 which terminates in a shoulder 120 sloped upwardly in the clockwise or extraction direction as viewed in FIG. 6. A flexible blade 122 is keyed to shaft 112 for rotation therewith.

A primary stop 124, which is shown in the form of a post, is provided on end flange 126 of the retractor and is adapted to engage portion 128. A second stop 130 is provided on end flange 126 at a location arcuately spaced from primary stop 124, for example, an arc distance of about 120°. Stop 130 is adapted to engage portion 128 and has an upper cam surface 132 adapted for contact with and disengagement of blade 122 from shoulder 120 of ramp 118 as is explained below.

A comfort spring 134, having a lower force than rewind spring 110, has one end attached to primary stop 124 and its other end attached to hook 136 provided on spring cup 114. Comfort spring 134 is shown as being in the form of a coil spring; however, a spiral spring similar to that shown in the previous embodiment may alternatively be employed.

Figure 7:
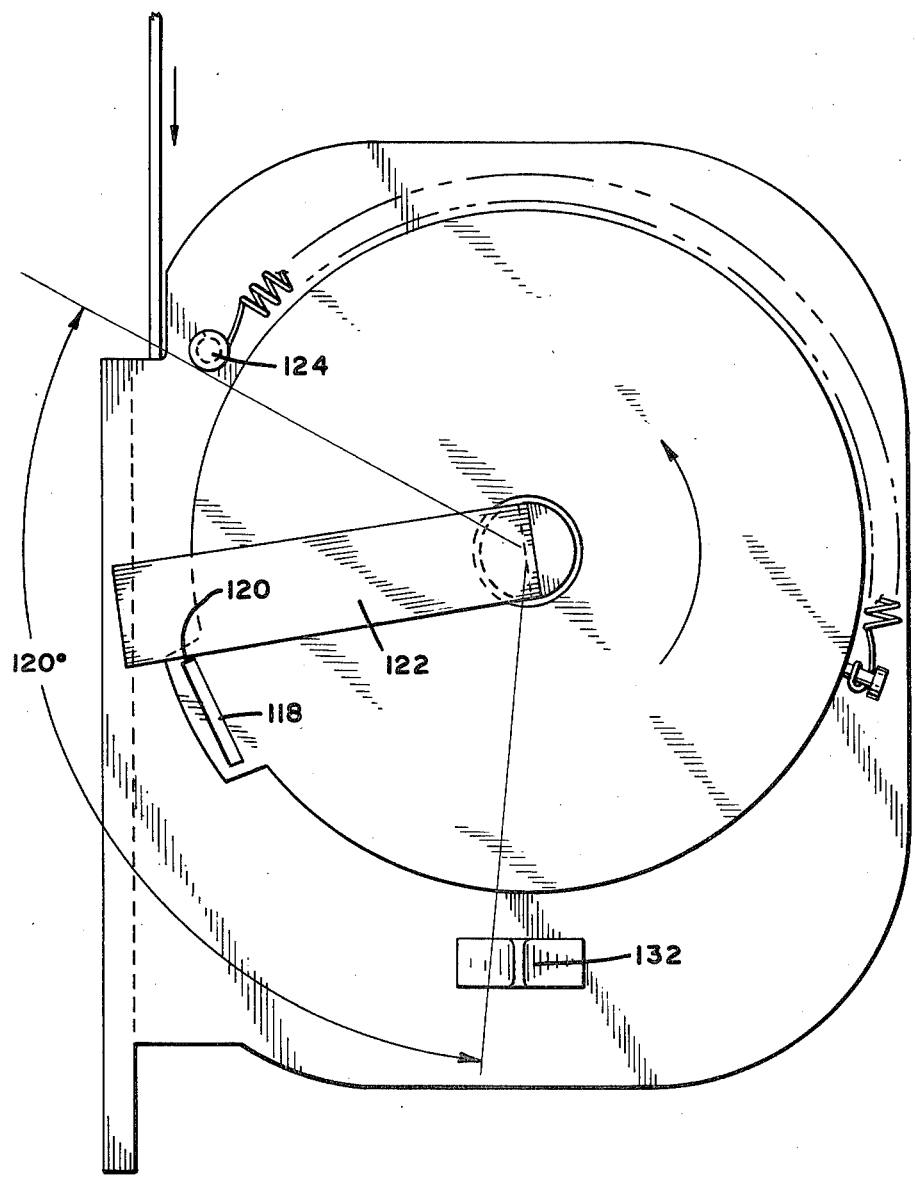
FIG. 7 is similar to FIG. 6 and shows the blocking means in its operable position.

In operation, portion 128 of spring cup 114 is in contact with primary stop 124 when the webbing is fully wound up. Upon extraction of the webbing (FIG. 6), shaft 112 rotates in a clockwise direction, with blade 122 moving therewith. Since this motion is causing energy storage in rewind spring 134, spring cup 114 and spring 134 are also attempting to rotate in a clockwise direction. However, rotation of spring cup 114 is prevented by the engagement of portion 128 with primary stop 124. During such extension, blade 122, encountering no restrictions and since it is flexible, rotates in a clockwise direction over cam 132 and over ramp 118 on spring cup 114. Once the seat belt is buckled and released, rewind spring 110 acts on shaft 112 and causes blade 122 to rotate in a counterclockwise direction. Such rotation of blade 122 is limited by its engagement with shoulder 120 of ramp 118. At this point, the force of rewind spring 110 maintains blade 122 against shoulder 120. As a result, rewind spring 110 is blocked out and the tension reduced means is thereby activated. Since comfort spring 134 is connected under tension to the periphery of spring cup 114, the spring cup assembly is rotated in a counterclockwise direction and since spring cup 114 is locked to shaft 112 through blade 122, such rotation maintains a light tension on the webbing for a predetermined distance of rotation. For example, such distance, which corresponds to the comfort zone, may extend for 120° of the arc. A comfort zone position is shown in FIG. 7. Before spring cup 114 rotates to the point where comfort spring 134 has no tension, blade 122 contacts cam 132 and rides up over the cam, thereby disengaging from shoulder 120 of ramp 118 (FIG. 8). At this point, rewind spring 110 is no longer blocked out and the retraction force is normal. When blade 122 is disengaged from shoulder 120, the stronger force of rewind spring 110 rotates blade 122 in the counterclockwise direction (FIG. 9) and its reaction force rotates spring cup 114 clockwise until it reaches primary stop 124. Rotation of spring cup 114 increases tension in comfort spring 134 to prepare it for the next activation, which occurs when blade 122 again locks against shoulder 120 and hence the cycle is repeated.

It can be seen that in accordance with this invention, a comfort mechanism is provided which is activated after extension of the seat belt webbing around the user and which when activated provides a relatively low force to wind up any excess belting and maintain the webbing comfortably against the user's shoulder. The comfort mechanism is automatically released upon a relatively large amount of seat belt extension and upon unbuckling of the belt. Moreover, the comfort mechanism may be incorporated into existing vehicle sensitive emergency locking retractors with minimum modifications and the comfort mechanism does not interfere with the locking operation of such retractors.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A safety belt retractor comprising a frame, a shaft mounted for rotation on said frame, a spool mounted on said shaft and having seat belt webbing wound thereon, first means biasing said spool in a rewind direction and having an inner end attached to said shaft and an outer end, and means for reducing the tension of the webbing against the wearer due to the bias force of the first biasing means, said tension reducing means comprising a second biasing means biasing said spool in the rewind direction and having a lower biasing force than said first biasing means, blocking means having an operable position at which it prevents said first biasing means from rotating said spool and an inoperable position at which it does not prevent such rotation, and means for moving said blocking means between said operable and inoperable positions, said blocking means being moved into said operable position after extension of the seat belt webbing to a position of use, said second biasing means operable to rewind said webbing when said blocking means is in its operable position, wherein said blocking means comprises a stop member provided on a rotary member mounted for rotation on said shaft, said stop member being fixed with respect to said rotary member, and a blade member having a thin, elongated shape, one end of said blade member being connected to said shaft so as to fix said blade member for rotation with said shaft, the other end of said blade member being operable to engage said stop member upon rewind from said extended position to prevent rotation of said rotary member with respect to said shaft, said rotary member being connected to said outer end of said first biasing means.

2. The retractor of claim 1 including a stop on said frame and cam means provided on said stop for disengaging said blade member from said stop member.

3. The retractor of claim 1 wherein said rotary member has a generally circular shape and said second biasing means extends partially around the circumference of said rotary member, one end of said second biasing means being attached to said rotary member and the other end of said second biasing means being fixed with respect to said frame.

4. The retractor of claim 1 wherein said rotary member comprising a spring cup having a radially outward extending portion upon which said stop member is provided, said stop member being in the form of a ramp extending from said axially outward facing surface of said spring cup upwardly in the extended direction and terminating in a shoulder which is adapted to engage said blade member, a first stop on said frame limiting rotation of said spring cup in the extending direction, a second stop on said frame limiting rotation of said spring cup in the rewind direction, a cam surface provided on said second stop for disengaging said blade from said shoulder, and said second biasing means comprising a spring having one end attached to said spring cup and its other end fixed with respect to said frame.

5. A safety belt retractor comprising
- a frame;
- a shaft mounted for rotation on said frame;
- a spool mounted on said shaft and having seat belt webbing wound thereon;
- a first spring having inner and outer ends;
- a first spring cup surrounding said first spring and being stationary with respect to said shaft;
- a second spring having inner and outer ends, said second spring having a lower biasing force than said first spring;
- a second spring cup surrounding said second spring and mounted for rotation with respect to said shaft, said first spring having its inner end attached to said second spring cup and its outer end attached to said first spring cup, said second spring having its inner end attached to said shaft and its outer end attached to said second spring cup, said first spring cup being located radially outwardly from said second spring cup;
- an axially outwardly facing surface on said second spring cup;
- a plurality of locking teeth on said surface of said second spring cup, said locking teeth being shaped for locking engagement in the rewind direction;
- a locking member fixed with respect to said frame and having a locking end engageable with said locking teeth of said second spring cup;
- cam means fixed to said shaft for rotation therewith and having a cam surface adapted to move said locking member away from said locking teeth;
- said locking end of said locking member being in locking engagement with one of said locking teeth upon retraction of said retractor following extension of said seat belt webbing, whereby said second spring cup is locked against rotation in the rewind direction; said first spring being ineffective to rewind said shaft when said second spring cup is locked and said second spring being effective to rewind said shaft when said second spring cup is locked;
- said cam means being engageable with said locking end of said locking member upon further retraction of said seat belt webbing, whereby said locking end is moved out of engagement with said locking teeth, thereby unlocking said second spring cup, said first spring being effective to rewind said shaft when said second spring cup is unlocked.

* * * * *